(No Model.)  
3 Sheets—Sheet 1.

R. CONDON.
VEHICLE.

No. 474,818. Patented May 17, 1892.

Attest:  
F. B. Kiefer.  
D. H. Mead.

Inventor:  
Richard Condon,  
by R. S. Dyrenforth  
his attorney.

(No Model.) 3 Sheets—Sheet 2.

R. CONDON.
VEHICLE.

No. 474,818. Patented May 17, 1892.

Attest:
F. B. Kueffer
D. H. Mead.

Inventor:
Richard Condon,
by R. S. Dyrenforth
his attorney (No Model.) 3 Sheets—Sheet 3.

R. CONDON.
VEHICLE.

No. 474,818. Patented May 17, 1892.

Attest:
F. B. Kiefer
D. H. Mead

Inventor:
Richard Condon
C. S. Dyrenforth
his attorney

UNITED STATES PATENT OFFICE.

RICHARD CONDON, OF LYONS, IOWA.

VEHICLE.

SPECIFICATION forming part of Letters Patent No. 474,818, dated May 17, 1892.

Application filed January 29, 1889. Serial No. 298,023. (No model.)

*To all whom it may concern:*

Be it known that I, RICHARD CONDON, a citizen of the United States, residing at Lyons, in the county of Clinton and State of Iowa, have invented certain new and useful Improvements in Propelling Vehicles; and I do hereby declare the following to be a full, clear, and exact description of the invention, such as will enable others skilled in the art to which it appertains to make and use the same.

This invention relates to means for propelling vehicles.

The object of the invention is to provide means whereby the weight of the load or the heavier portions of the vehicles themselves may be utilized as an aid in propelling the vehicles or of retarding their motion in going downgrade.

With this object in view the invention resides, essentially, in a car, wagon, or the like provided with a swinging portion carrying or sustaining the load and connected with the motive power, whereby the load will be swung in such manner as to aid in propelling the vehicle or in retarding its motion.

I have illustrated the invention in the accompanying drawings, in which—

Figure 1:
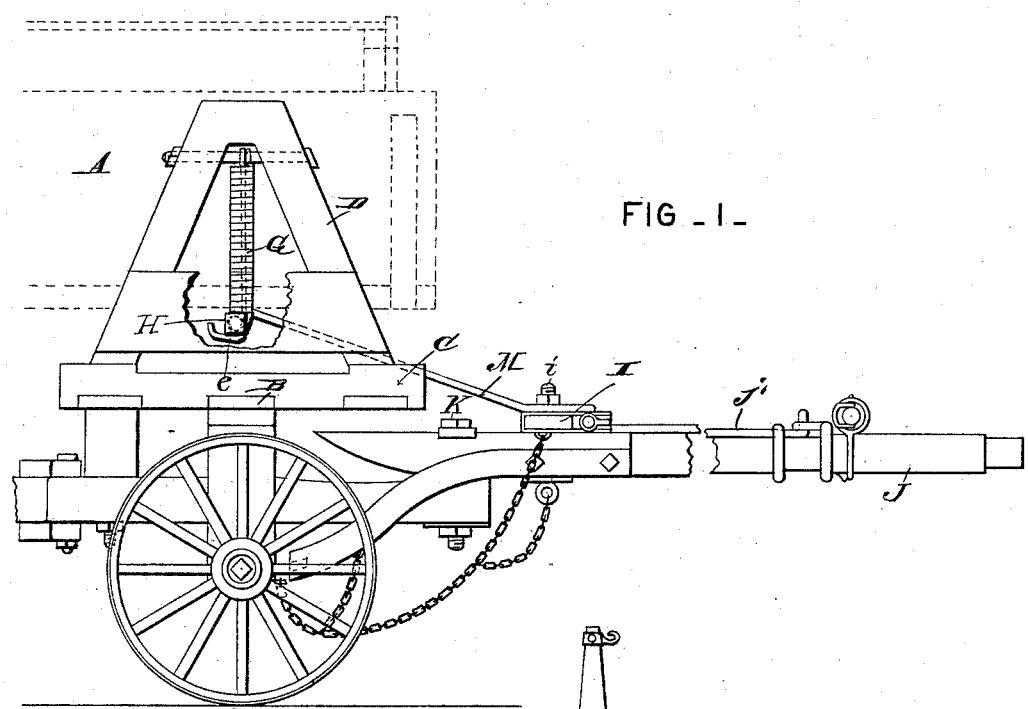
Figure 2:
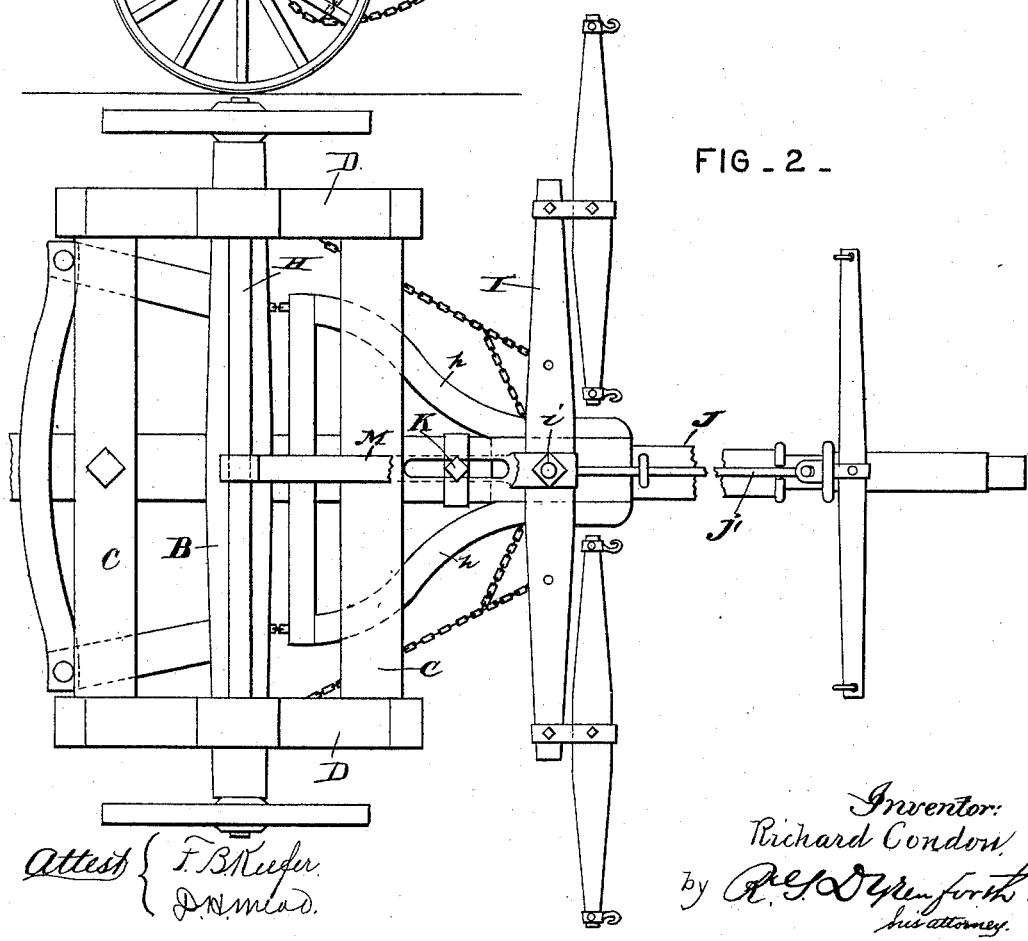
Figure 3:
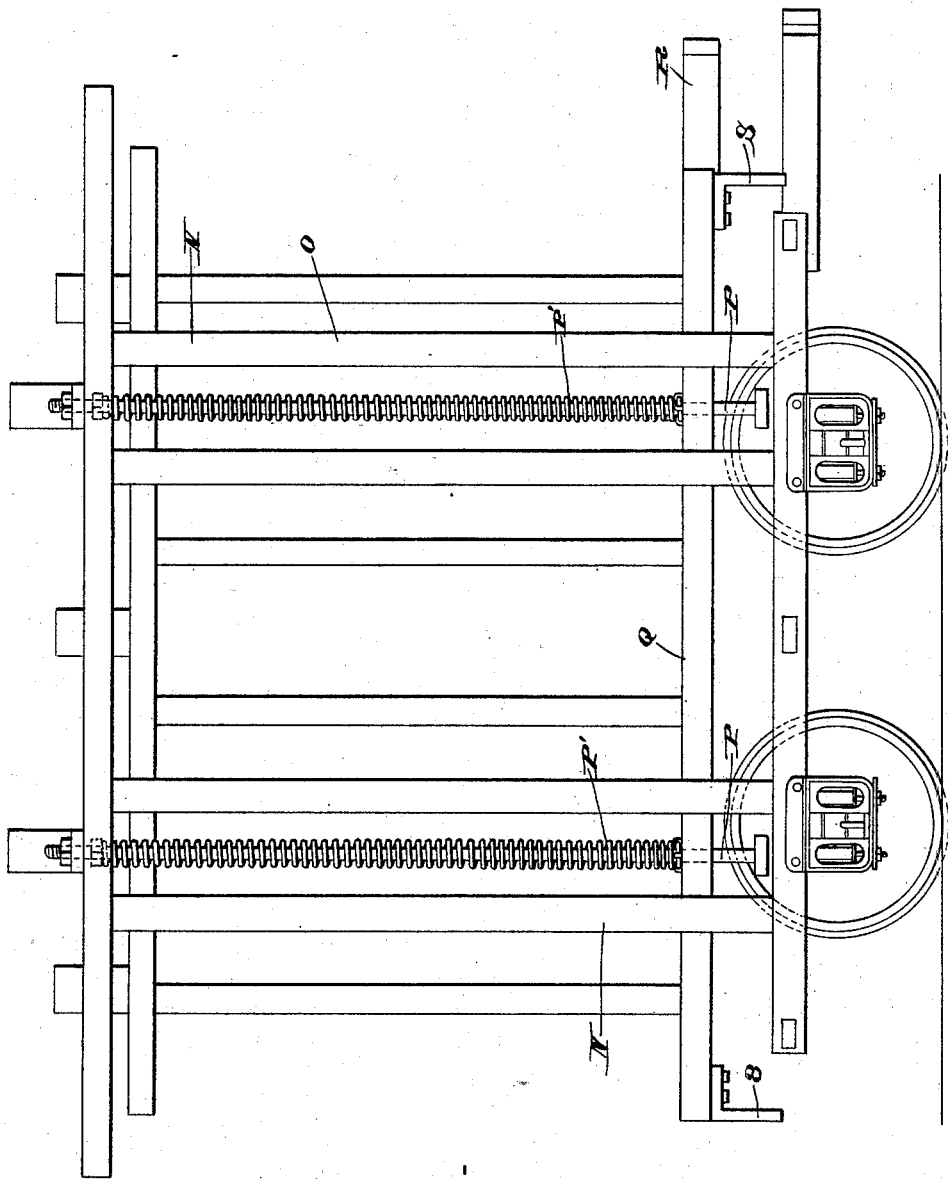
Figure 4:
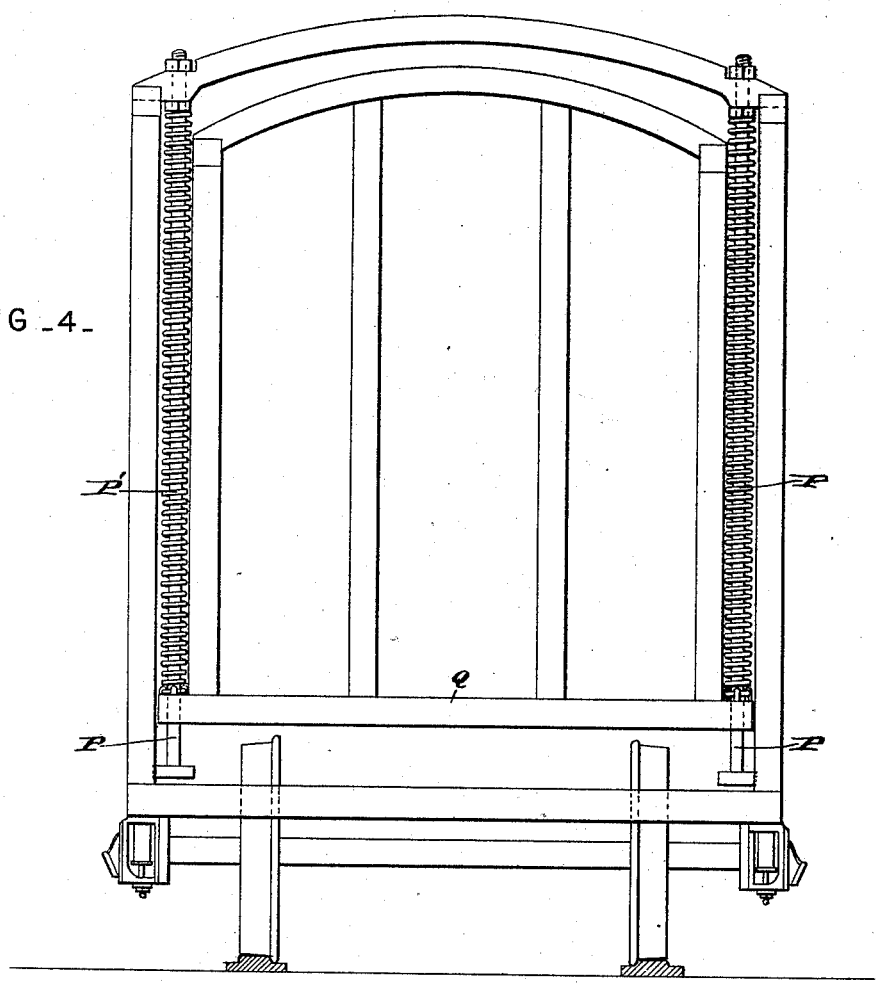
Figure 5:
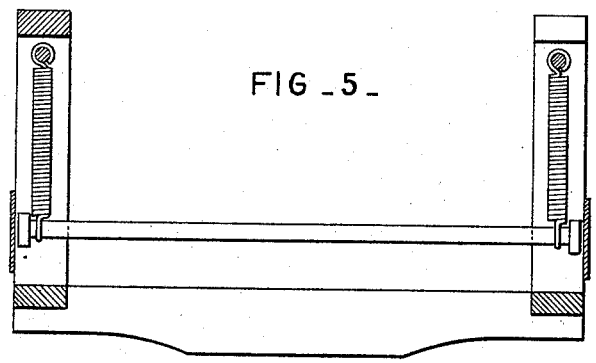

Figure 1 represents a side elevation of a wagon-frame constructed to embody my invention, the wagon-frame adapted to receive a load being shown in dotted lines. Fig. 2 represents a plan view of the same. Fig. 3 represents a side elevation of a car embodying my invention, a portion of the side of the car being broken away in order more clearly to illustrate the arrangement of parts. Fig. 4 is an end view of the car, and Fig. 5 is a detail view showing the means of suspending the body of the car and also the means whereby the swinging motion is limited.

In Figs. 1 and 2 of the drawings, A represents the frame of an ordinary wagon provided with the usual bolster B and with the cross-pieces C at the rear end of the wagon. To the bolster B and cross-piece C are connected the upright frames D, which are of any suitable construction and strength to sustain the weight of the wagon-body and the load to be carried thereby. Suspended from each of these frames are the rods E, provided at their lower ends with hooks e, and surrounding each of the rods are springs G. To the lower ends of each of these springs is connected one end of a bar H, upon which rests the wagon-body. The hooks e at the ends of the rods serve to limit the downward movement of the bars H and prevent the wagon-body from descending upon the wagon-bed. The wagon-body is designed to be connected with the bars H in such manner as to have no longitudinal movement independent thereof, a limited swinging motion being allowed the body when in place.

I represents the whiffletree, connected by means of the king-bolt $i$ with the rear end of the tongue J, the tongue being provided with a slot for the reception of the king-bolt K, whereby the tongue is connected with the reach L in such manner as to allow a limited longitudinal motion of the tongue. The neck-yoke is capable of sliding on the tongue and is connected with the whiffletree by a rod $j'$, in order that the relative positions of the whiffletree and neck-yoke may remain unchanged.

M represents a rigid rod connecting the whiffletree and the forward bar H. From this construction it will be seen that when the team attached to the whiffletree is started the swinging frame and the weight of the wagon-body and contents is swung slightly forward, and as this weight is much greater than that of the wheels and running-gear the tendency of the parts to resume their normal position and maintain their equilibrium will result in a forward motion of the lighter portion—namely, the wheels.

In Figs. 3, 4, and 5 of the drawings, N represents the main frame of a car, consisting, essentially, of the bed-frame, to which the axles are attached, the uprights O, and the top attached to the uprights. Connected in a suitable manner to the uprights are the rods P, surrounded by springs P', which are connected at their lower ends with the movable portion Q of the car. This portion embodies the floor, platform, seats, &c., of a passenger-car, and the body which receives the freight of a freight-car, thus making it heavier than the other portions of the car. The coupler R is connected to the bottom of the swinging portion, and the movement either forward or backward of the swinging portion is limited by projections S, extending downward from the lower face of the car, having their lower ends on a plane with the bottom portion of the car.

These projections allow a limited swinging motion of the movable part of the car, but regulate the motion so as to avoid displacement. It will be seen that the action of the moving portion is the same either in the car or wagon, the heavier portion being swung forward in order to aid in propelling the car forward. It will also be clear that in going downhill when the horses are drawn back or when the bumpers are forced rearward by contact with the engine or a preceding car the weight will be swung backward, thus retarding the forward motion, the effect of forcing it rearward of course being diametrically opposite to that of swinging it forward.

Having thus fully described my invention, what I claim as new, and desire to secure by Letters Patent, is—

1. In a vehicle, a running-gear and a load-carrier or body suspended above the running-gear in a manner to allow of its swinging, in combination with a longitudinally-movable tongue connected with the load-carrier, substantially as described.

2. In a vehicle, the combination, with the frame, of uprights, rods suspended from the frame, springs carried by the rods, cross-pieces carried by the springs, and the wagon-body supported on the cross-pieces, substantially as described.

3. In a vehicle, the combination, with the frame, of uprights, rods suspended from the uprights and having hooks at their lower ends, springs carried by the rods, cross-pieces carried by the springs, a wagon-body supported on the cross-pieces, and a longitudinally-movable tongue connected to the cross-pieces, substantially as described.

In testimony whereof I affix my signature in presence of two witnesses.

RICHARD CONDON.

Witnesses:
DAVID H. MEAD,
H. C. JOHNSON.